US012320268B2

(12) United States Patent
Rochin Machado et al.

(10) Patent No.: US 12,320,268 B2
(45) Date of Patent: Jun. 3, 2025

(54) TURBINE EXHAUST COLLECTOR

(71) Applicant: General Electric Company, Schenectady, NY (US)

(72) Inventors: Jorge Mario Rochin Machado, Queretaro (MX); Paul Roberts Scarboro, Charlottseville, VA (US); Jordan Scott Warton, Houston, TX (US); Michael Anthony Acosta, Houston, TX (US); Ashish Agrawal, Houston, TX (US); Miroslaw Pawel Babiuch, Masovian (PL)

(73) Assignee: GE Infrastructure Technology LLC, Greenville, SC (US)

( * ) Notice: Subject to any disclaimer, the term of this patent is extended or adjusted under 35 U.S.C. 154(b) by 109 days.

(21) Appl. No.: 18/047,136

(22) Filed: Oct. 17, 2022

(65) Prior Publication Data

US 2023/0068693 A1 Mar. 2, 2023

Related U.S. Application Data

(63) Continuation of application No. 16/727,410, filed on Dec. 26, 2019, now Pat. No. 11,473,450.

(51) Int. Cl.
*F01D 25/30* (2006.01)

(52) U.S. Cl.
CPC .......... *F01D 25/30* (2013.01); *F05D 2240/12* (2013.01)

(58) Field of Classification Search
CPC .. F05D 2230/51; F05D 2240/12; F01D 25/28; F01D 25/32; F01D 25/30
See application file for complete search history.

(56) References Cited

U.S. PATENT DOCUMENTS

| | | | | |
|---|---|---|---|---|
| 5,951,246 | A | 9/1999 | Uematsu et al. | |
| 6,419,448 | B1 | 7/2002 | Owczarek | |
| 8,511,984 | B2 | 8/2013 | Subbarao et al. | |
| 8,851,441 | B2 * | 10/2014 | Acuna | F01D 25/28 206/319 |
| 2008/0060362 | A1 | 3/2008 | Poccia et al. | |
| 2014/0348647 | A1 | 11/2014 | Stang et al. | |
| 2015/0075131 | A1 | 3/2015 | Hirako et al. | |
| 2015/0267565 | A1 * | 9/2015 | Tozzi | F01D 25/30 415/211.2 |

FOREIGN PATENT DOCUMENTS

| | | | |
|---|---|---|---|
| GB | 809811 | A | 3/1959 |
| WO | 2014064031 | A1 | 5/2014 |

* cited by examiner

*Primary Examiner* — Courtney D Heinle
*Assistant Examiner* — Andrew Thanh Bui
(74) *Attorney, Agent, or Firm* — Fletcher Yoder, P.C.

(57) ABSTRACT

A system includes a modular exhaust collector configured to be arranged in a first orientation or a second orientation. The modular exhaust collector is configured to receive an exhaust flow along an inlet axis, to direct the exhaust flow along a first direction through an outlet when in the first orientation, and to direct the exhaust flow along a second direction through the outlet when in the second orientation. The modular exhaust collector includes an exhaust passage to receive the exhaust flow, a plurality of compressor discharge (CD) ports, a plurality of flow ports, a bottom face opposite the outlet with a first drain, and a first side wall with a second drain between the bottom face and the outlet. Each CD port is disposed a first radial distance from the inlet axis, and each flow port is disposed a second radial distance from the inlet axis.

22 Claims, 6 Drawing Sheets

TURBINE EXHAUST COLLECTOR

CROSS-REFERENCE TO RELATED APPLICATIONS

This application is a continuation of U.S. patent application Ser. No. 16/727,410, entitled "TURBINE EXHAUST COLLECTOR," filed Dec. 26, 2019, which is based upon and claims the benefit of priority from Polish patent application number PL P.428326 filed on Dec. 28, 2018, both of which are herein incorporated by reference in their entireties for all purposes.

BACKGROUND

The subject matter disclosed herein relates to turbine systems, and more particularly to systems and methods for turbine systems with a modular turbine exhaust collector.

Typically, power plants are built to provide power to customers connected to a power grid. Gas turbine systems generally include a gas turbine engine having a compressor section, a combustor section, and a turbine section. The turbine section receives hot combustion gases and outputs exhaust and usable rotational energy. An exhaust diffuser is coupled to the turbine to receive exhaust from the turbine. The exhaust diffuser is also coupled to an exhaust collector where at least some of the exhaust from the exhaust diffuser is output. The exhaust may be vented directly, or directed to a system to recover heat from the exhaust before the exhaust is vented. However, the equipment used to recover heat from the exhaust may increase costs of the power plant, and/or the equipment may increase the foot print of the power plant. Also, an exhaust collector may be unsuitable for changing the routing direction, or it may be costly to change a routing direction of the exhaust from the gas turbine system.

BRIEF DESCRIPTION

Certain embodiments commensurate in scope with the original claims are summarized below. These embodiments are not intended to limit the scope of the claims, but rather these embodiments are intended only to provide a brief summary of possible forms of the claims. Indeed, the claims may encompass a variety of forms that may be similar to or different from the embodiments set forth below.

In a first embodiment, a system includes a modular exhaust collector configured to be arranged in one of a first orientation and a second orientation. The modular exhaust collector is configured to receive an exhaust flow along an inlet axis through an inlet face into a collector chamber. The modular exhaust collector is configured to direct the exhaust flow along a first direction through an outlet when the modular exhaust collector is arranged in the first orientation, and to direct the exhaust flow along a second direction through the outlet when the modular exhaust collector is arranged in the second orientation. The inlet axis is different than the first direction and the inlet axis is different than the second direction. The modular exhaust collector includes an exhaust passage configured to receive the exhaust flow, a plurality of compressor discharge (CD) ports, a plurality of flow ports, a bottom face disposed opposite the outlet, and a first side wall between the bottom face and the outlet. Each CD port of the plurality of CD ports is disposed a first radial distance from the inlet axis, and each flow port of the plurality of flow ports is disposed a second radial distance from the inlet axis. The bottom face includes a first drain, and the first side wall includes a second drain.

In a second embodiment, a system includes a diffuser configured to receive an exhaust flow from a turbine of a gas turbine system, and a modular exhaust collector coupled to the diffuser. The modular exhaust collector may be arranged in one of a first orientation and a second orientation. The modular exhaust collector is configured to receive the exhaust flow along an inlet axis through an inlet face into a collector chamber, to direct the exhaust flow in a first direction through an outlet when the modular exhaust collector is arranged in the first orientation, and to direct the exhaust flow along a second direction through the outlet when the modular exhaust collector is arranged in the second orientation. The modular exhaust collector includes an inlet face with an exhaust passage configured to receive the exhaust flow from the diffuser, a bottom face opposite the outlet, and a first side wall between the bottom face and the outlet. The bottom face includes a first drain configured to be at a low point of the collector chamber to drain a liquid in the collector chamber when the modular exhaust collector is arranged in the first orientation. The first side wall includes a second drain configured to be at the low point when the modular exhaust collector is arranged in the second orientation.

In a third embodiment, a method includes rearranging a modular exhaust collector from an assembled orientation to an adjusted orientation relative to a turbine of a gas turbine system. The modular exhaust collector is configured to receive from the turbine an exhaust flow along an inlet axis through an inlet face of the modular exhaust collector. Rearranging the modular exhaust collector includes uncoupling a first port from a conduit of the gas turbine system, rotating the modular exhaust collector an angle about the inlet axis to reorient an outlet of the modular exhaust collector from an outlet direction in the assembled orientation to an adjusted outlet direction in the adjusted orientation, and coupling a second port to the conduit of the gas turbine system. The first port is disposed on an inlet face of the modular exhaust collector in a first position relative to the inlet axis. Rotating the modular exhaust collector by the angle arranges the second port disposed on the inlet face of the modular exhaust collector in the first position.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

Gas turbine systems may be deployed to a variety of locales to provide power for use at various locations. The exhaust from a gas turbine system installed at a site may be directed in various directions from the turbine. The direction of the exhaust from the gas turbine system may be based at least in part on a power demand for the site, a configuration of the gas turbine system on the site relative to other structures at the site, a size of the site, the type (e.g., heat recovery steam generator (HRSG), exhaust treatment) of equipment available at the site, and future plans for equipment at the site, among other factors. A modular exhaust collector of the gas turbine system that may be alternatively arranged in multiple orientations for the gas turbine system may improve inventory management and rapid deployment of the gas turbine system from the manufacturer to the customer. Furthermore, removably coupling the modular exhaust collector to the gas turbine system may reduce the costs or complexity of changes to the site, such as the addition, removal, or location adjustment of equipment (e.g., HRSG) at the site. Additionally, features of the modular exhaust collector described below facilitate reversible rearrangement of the exhaust collector from a first orientation (e.g., leftward) to a second orientation (e.g., vertical) or to a third orientation (e.g., rightward) without structural modifications to the modular exhaust collector for support of the modular exhaust collector. Ports of the modular exhaust collector may be positioned about an inlet axis of the modular exhaust collector to facilitate fluid connections to the modular exhaust collector in multiple orientations.

Figure 1:
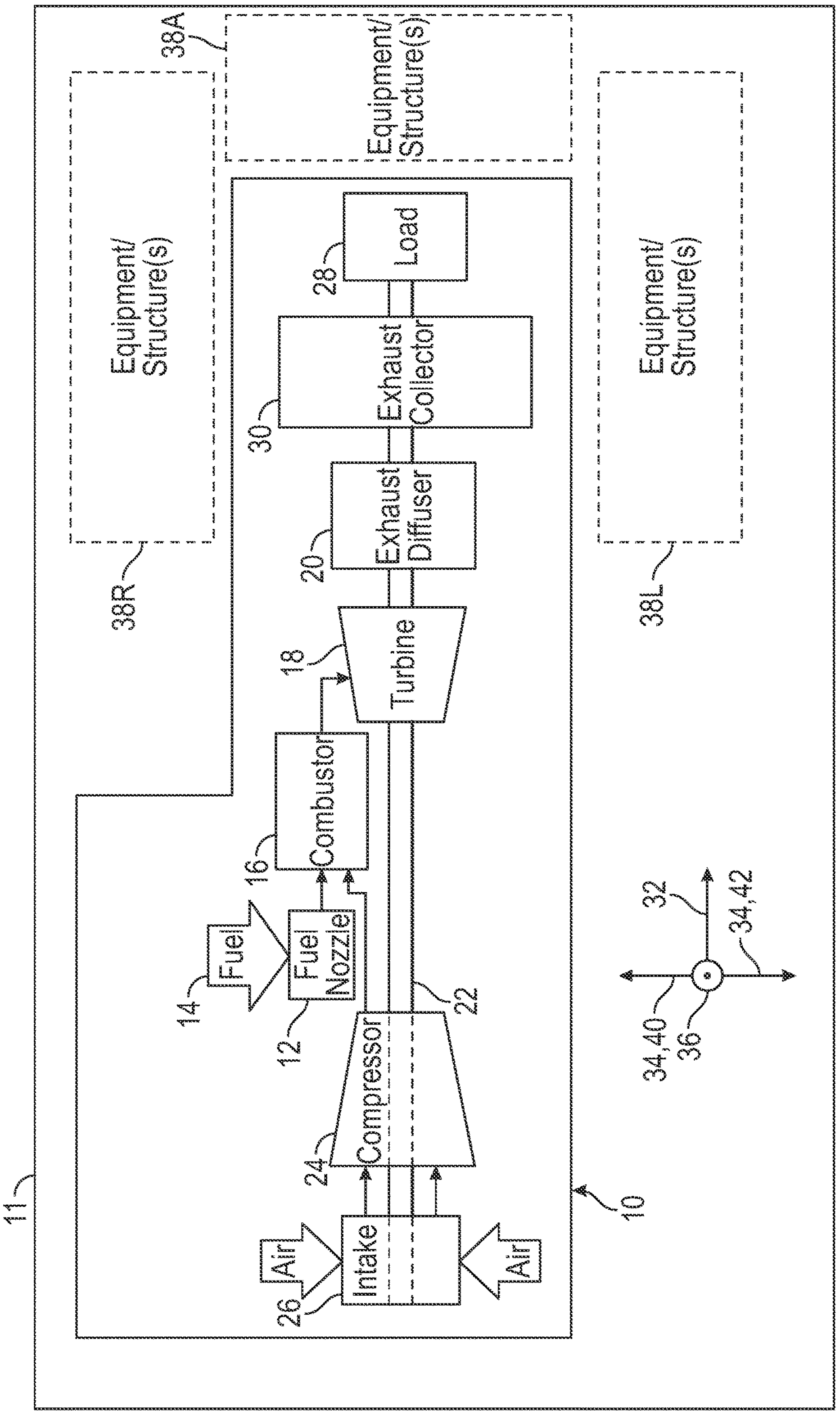
FIG. 1 is a top view block diagram of an embodiment of a gas turbine system with a modular exhaust collector at a site.

Turning now to the figures, FIG. 1 is a top view block diagram of an embodiment of a turbine system 10 (e.g., gas turbine engine) at a site 11 that utilizes a modular exhaust collector 30. The turbine system 10 may use liquid or gas fuel, such as natural gas and/or a hydrogen rich synthetic gas, to drive the turbine system 10. As depicted, the fuel nozzles 12 intake a fuel supply 14, mix the fuel with air, and distribute the fuel-air mixture into a combustor 16 in a suitable ratio for optimal combustion, emissions, fuel consumption, and power output. The turbine system 10 may include fuel nozzles 12 located inside one or more combustors 16. The fuel-air mixture combusts in a chamber within the combustor 16, thereby creating hot pressurized exhaust gases. The combustor 16 directs a flow the exhaust gases in an axial direction 32 through a turbine 18 toward a gas turbine exhaust diffuser 20. As the exhaust gases pass through the turbine 18, the gases force turbine blades to rotate one or more shafts 22 along an axis of the turbine system 10.

As illustrated, the one or more shafts 22 may be connected to various components of the turbine system 10, including a compressor 24. The compressor 24 also includes blades coupled to the one or more shafts 22. As the one or more shafts 22 rotate, the blades within the compressor 24 also rotate, thereby compressing air from an air intake 26 through the compressor 24 and into the fuel nozzles 12 and/or combustor 16. The one or more shafts 22 may also be connected to a load 28, which may be a vehicle or a stationary load, such as an electrical generator in a power plant or a propeller on an aircraft, for example. The load 28 may include any suitable device capable of being powered by the rotational output of the turbine system 10. An exhaust collector 30 may be used to capture and redirect the exhaust flow exiting the gas turbine engine. The exhaust collector 30 may redirect the exhaust flow from the axial direction 32 to a lateral direction 34 (e.g., leftward, rightward), to a vertical direction 36, or some combination thereof. The exhaust diffuser 20 may be partially disposed within the exhaust collector 30.

As described in greater detail below, the exhaust collector 30 may be a modular exhaust collector 30 that may be removably coupled to the turbine 18 and the exhaust diffuser 20 to redirect the exhaust flow in a desired direction, such as a direction substantially perpendicular to the direction the exhaust flow enters the modular exhaust collector 30. In some embodiments, the modular exhaust collector 30 is arranged in a first (e.g., vertical) orientation, such that the exhaust flow is directed primarily in the vertical direction 36 (i.e., away from the ground of the site 11). The vertical orientation of the modular exhaust collector 30 may be used for gas turbine systems 10 without a heat recovery steam generator (HRSG) or other exhaust processing equipment 38. Additionally, or in the alternative, the vertical orientation of the modular exhaust collector 30 may facilitate venting the exhaust flow to the atmosphere in a direction that is away from the adjacent equipment 38A, 38L, 38R or structures of the site 11.

In some embodiments, the modular exhaust collector 30 is arranged in one of a second (e.g., lateral) orientations, such that the exhaust flow is directed primarily in one of the lateral directions 34 (i.e., along the ground of the site 11). For example, arrangement of the modular exhaust collector 30 in a right hand (RH) orientation may direct the exhaust flow in a rightward direction 40 toward the exhaust processing equipment 38R (e.g., HRSG), which may subsequently vent the exhaust flow in any direction. Arrangement of the modular exhaust collector 30 in a left hand (LH) orientation may direct the exhaust flow in a leftward direction 42 toward the exhaust processing equipment 38L (e.g., HRSG), which may subsequently vent the exhaust flow in any direction. In some embodiments, the exhaust diffuser 20 may be removably coupled from the turbine 18 and adjusted with the modular exhaust collector 30 in one of the various orientations described herein.

Figure 2:
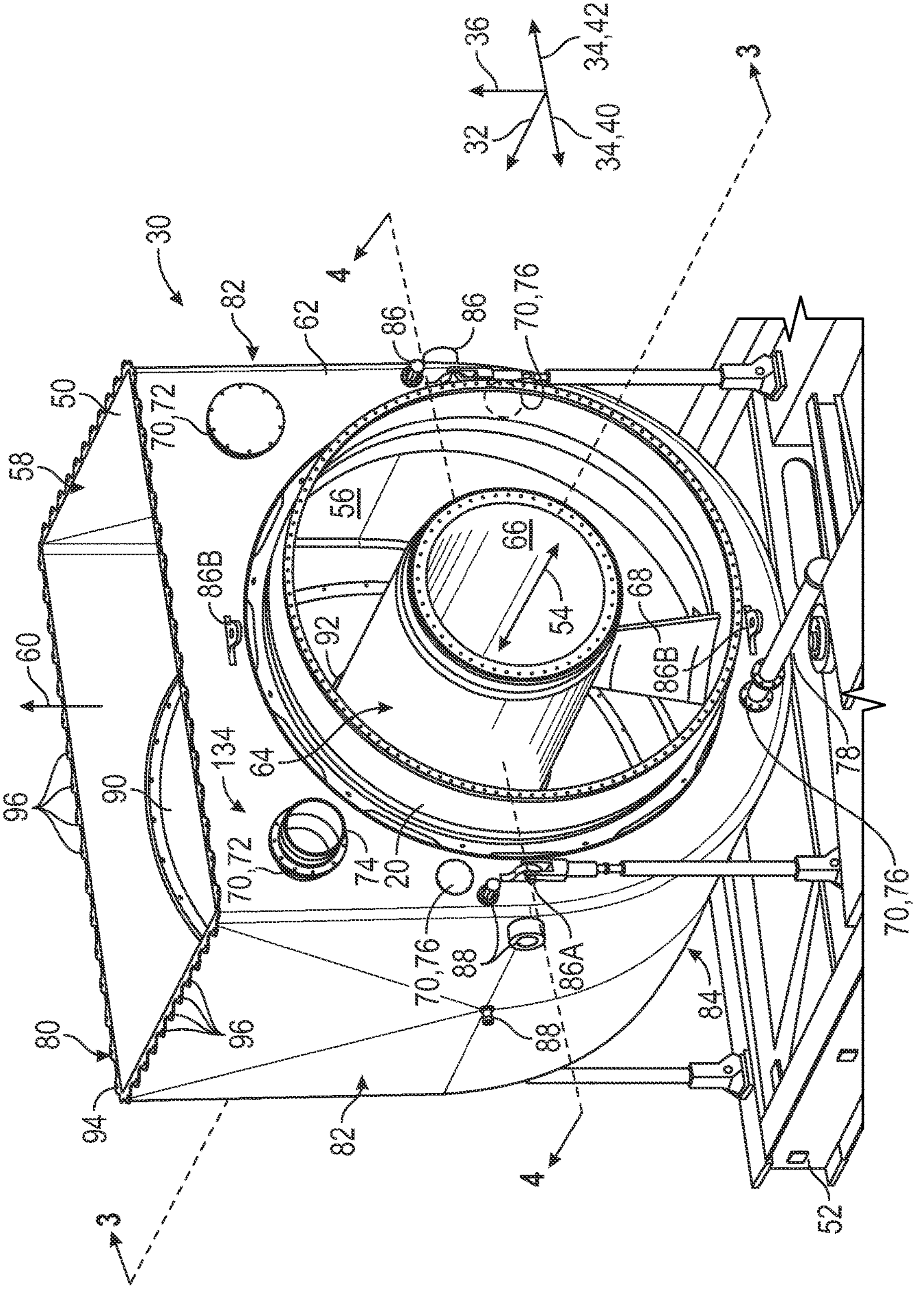
FIG. 2 is a perspective view of an embodiment of the modular exhaust collector of the gas turbine system, wherein the modular exhaust collector is arranged in a vertical orientation.

FIG. 2 is a perspective view of an embodiment of the modular exhaust collector 30 of the gas turbine system 10, wherein the modular exhaust collector is arranged in a vertical orientation 50. For clarity of illustration of the features of the modular exhaust collector 30, the turbine 18, the combustor 16, the one or more shafts 22, and the compressor 24 of the gas turbine system 10 are not shown in FIG. 2. Components of the gas turbine system 10, such as the modular exhaust collector 30, may be disposed on one or more frames 52. The modular exhaust collector 30 is coupled to the diffuser 20, which is downstream of the turbine 18 relative to an inlet axis 54 (i.e., turbine axis). The modular exhaust collector 30 receives the exhaust flow along the inlet axis 54 from the diffuser 20 into a collector chamber 56, and redirects the exhaust flow through an outlet 58 in an outlet direction 60. As discussed in detail below, the modular exhaust collector 30 may be arranged in various orientations relative to the inlet axis 54, such that the outlet direction 60 may be generally aligned with the vertical direction 36 or one of the lateral directions 34 (e.g., rightward direction 40, leftward direction 42). The outlet direction 60 may be substantially perpendicular to the inlet axis 54. That is, the outlet direction 60 may be within 30 degrees or les s of perpendicular with the inlet axis 54.

The diffuser 20 may be coupled to and/or extend through an inlet face 62 of the modular exhaust collector 30, and the exhaust flow from the diffuser 20 is received through an exhaust passage 64. In some embodiments, a bore 66 extends through the exhaust passage 64. One or more shafts 22 and/or bearings of the gas turbine system 10 may be disposed within the bore 66. A wedge 68 may be coupled to the diffuser 20 or to the modular exhaust collector 30. The wedge 68 may be configured to support the bore 66 and/or to direct the exhaust flow toward the outlet 58. In some embodiments, the wedge 68 is arranged opposite the outlet 58, such that the wedge 68 may be generally aligned in the lateral direction 34 when the modular exhaust collector 30 is disposed in one of the lateral orientations. In some embodiments, the diffuser 20 and the wedge 68 may be arranged in various orientations relative to the inlet axis 54.

The inlet face 62 may have a plurality of ports 70, some of which are configured to be coupled to other components of the gas turbine system 10 and/or the power plant 8. For example, the plurality of ports 70 may have a first set of one or more compressor discharge (CD) ports 72 that are configured to receive a CD flow from the compressor 24, such as via a CD conduit 74. The CD conduit 74 may be positioned above the inlet axis 54 of the gas turbine system 10. In some embodiments, the CD flow is a bleed flow from the compressor 24, a diluent flow, a cooling flow, or any combination thereof. As discussed below, each CD port 72 may be disposed on the inlet face 62 such that one of the CD ports 72 may be coupled to the CD conduit 74 regardless of the orientation of the modular exhaust collector 30. For example, each CD port 72 may be disposed a CD port distance from the inlet axis 54, such that rotation of the modular exhaust collector 30 from the vertical orientation 50 to a left hand orientation would enable another CD port 72 to be coupled to the CD conduit 74 without rerouting or otherwise moving the CD conduit 74. The one or more CD ports 72 that are not coupled to the CD conduit 74 in a particular orientation of the modular exhaust collector 30 may be capped, as illustrated in FIG. 2.

The plurality of ports 70 may have a second set of one or more flow ports 76, such as air and oil (A&O) separator ports that are configured to be in fluid communication with an air/oil flow of the gas turbine system 10 via an A&O conduit 78. In some embodiments, the A&O conduit 78 is positioned below the inlet axis 54 of the gas turbine system 10. As discussed in detail below, each flow port 76 may be disposed on the inlet face 62 such that one of the flow ports 76 may be coupled to the conduit 78 regardless of the orientation of the modular exhaust collector 30. The one or more flow ports 76 that are not coupled to the conduit 78 in a particular orientation of the modular exhaust collector 30 may be capped, as illustrated in FIG. 2.

The modular exhaust collector 30 may include support structures 86 (e.g., links, trunnions, shear pins) that are arranged to be rotationally symmetric about the inlet axis 54 for various orientations of the modular exhaust collector 30. These support structures 86 may be disposed on the inlet face 62, a back face 80 of the modular exhaust collector 30, side walls 82 of the modular exhaust collector 30, a bottom face 84 of the modular exhaust collector 30, or any combination thereof. The support structures 86 may be configured to facilitate lifting or positioning of the modular exhaust collector 30 in a desired orientation prior to operation of the gas turbine system 10. Additionally, or in the alternative, the support structures 86 may be configured to support the modular exhaust collector 30 while in the desired orientation during operation of the gas turbine system 10. For example, the links 86A may be configured to couple the modular exhaust collector 30 to the frame 52 in the vertical orientation 50 while the links 86B are uncoupled from the frame 52; however, the links 86B may be configured to couple the modular exhaust collector 30 to the frame 52 in the lateral orientation while the links 86A are uncoupled from the frame 52.

During operation of the gas turbine system 10, liquid may collect within the collector chamber 56. For example, a wash solution may collect within the collector chamber during a wash procedure, fuel may collect during a testing procedure, fuel may collect during a startup or shutdown procedure, or any combination thereof. Multiple drains 88 of the modular exhaust collector 30 may facilitate draining liquid from the collector chamber 56 regardless of the orientation of the modular exhaust collector 30. That is, one of the drains 88 of the modular exhaust collector 30 may be positioned at a low point of the collector chamber 56 despite that the low point of the collector chamber 56 changes with the orientation of the modular exhaust collector 30. A curved shape of the bottom face 84 may direct the exhaust flow to the outlet 58 and may facilitate drainage of liquid to a vertical drain 88 when the modular exhaust collector 30 is in the vertical orientation 50. Moreover, a curved shape of the bottom face 84 may reduce and/or diffuse stress on the bottom face 84 of the modular exhaust collector 30. Drains 88 on each sidewall 82 may facilitate drainage of liquid in the collector chamber when the modular exhaust collector 30 is in the lateral orientation 50. Moreover, the sidewalls 82 may be sloped toward the drains 88. Channels and/or the shape of a respective sidewall 82 may be configured to position the respective drain 88 at the low point on the respective sidewall 82 when the modular exhaust collector is in the lateral orientation that positions the respective sidewall 82 below the inlet axis 54.

An inside of the back face 80 facing the collector chamber 56 may have a conical surface 90. The conical surface 90 may facilitate redirection of the exhaust flow from the diffuser 20 along the inlet axis 54 toward the outlet 58 in the outlet direction 60. In some embodiments, the conical surface 90 may reduce and/or diffuse stress on the back face 80 of the modular exhaust collector 30. The conical surface 90 may be coupled to the bore 66 through the collector chamber 56. In some embodiments, the conical surface 90 may have a filleted connection to the bore 66, thereby reducing stress on the conical surface 90 and/or the bore 66. Moreover, the interface between the side walls 82 and one or more of the inlet face 62 and the back face 80 may be curved to reduce and/or diffuse stress on the interfaces of the modular exhaust collector 30.

The outlet 58 of the modular exhaust collector 30 may be coupled to equipment 38 or structures of the power plant 8, such as an exhaust treatment system, a catalyst system, an HRSG, or any combination thereof. In some embodiments, a flange 94 of the outlet 58 may have a plurality of stress reducing features 96, such as scalloped edges and/or thermally conductive materials. During startup of the gas turbine system, the temperature of the outlet 58 and the flange 94 may rapidly increase from an ambient temperature to an exhaust temperature, thereby inducing thermal stress on the outlet 58. The plurality of stress reducing features 96 of the flange 94 may diffuse or distribute heat along the flange 94, thereby reducing thermal stress and thermal expansion of the flange 94.

Figure 3:
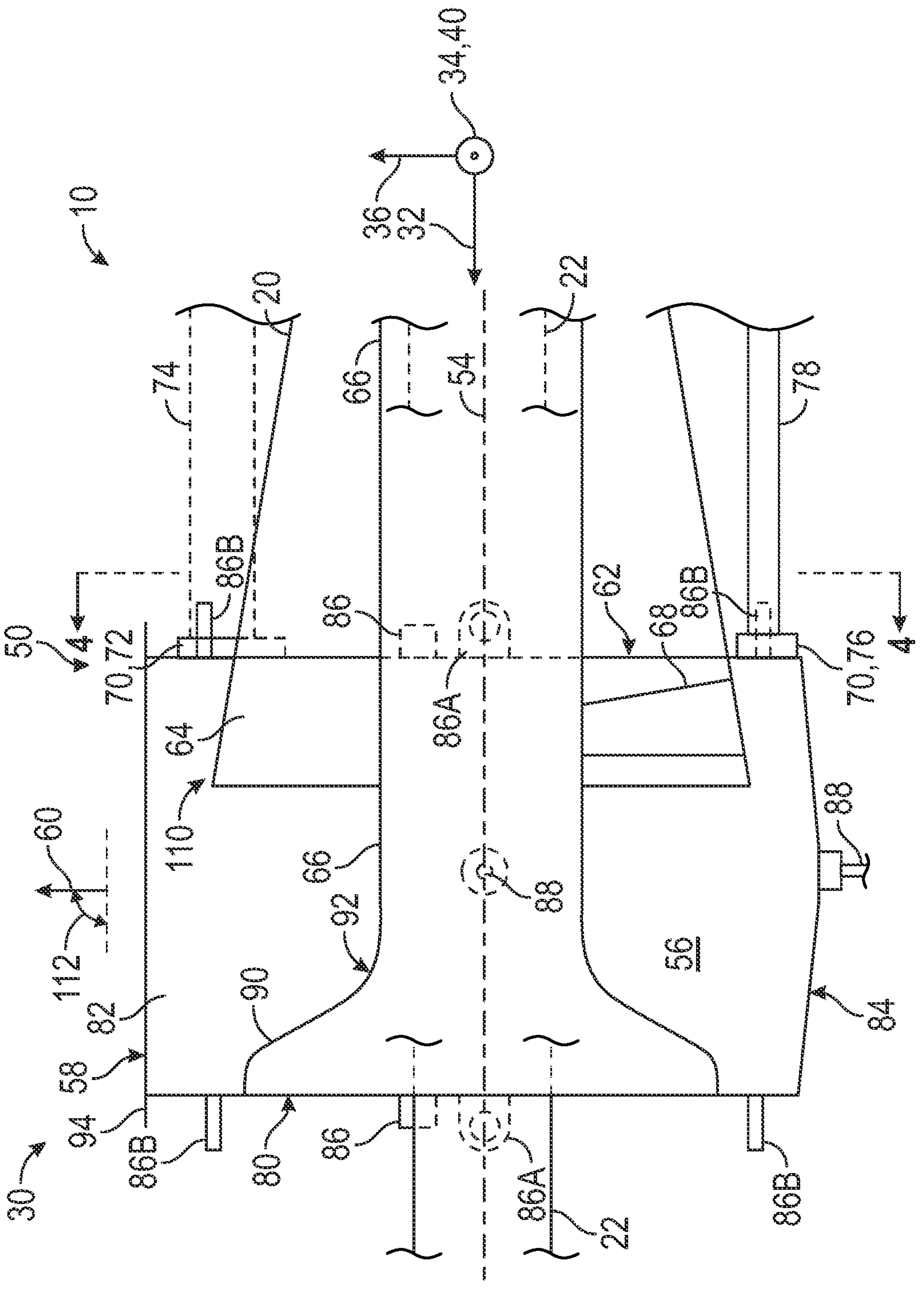
FIG. 3 is a longitudinal cross-sectional view of an embodiment of the modular exhaust collector of the gas turbine system, wherein the cross-sectional view is taken along line 3-3 of FIG. 2.

FIG. 3 illustrates is a longitudinal cross-sectional view of an embodiment of the modular exhaust collector 30 of the gas turbine system 10, wherein the cross-sectional view is taken along line 3-3 of FIG. 2. Exhaust from the diffuser 20 may be directed into the collector chamber 56 of the modular exhaust collector 30 through an end portion 110 of the diffuser 20, then redirected to the outlet 58 in the outlet direction 60. The conical surface 90 of the back face 80 may facilitate redirecting the exhaust flow to the outlet 58. The one or more shafts 22 of the gas turbine system 10 may extend through the conical surface 90 and the bore 66 of the modular exhaust collector 30. While the outlet direction 60 from the outlet 58 is illustrated in FIG. 3 to be in the vertical direction 36 when the modular exhaust collector 30 is arranged in the vertical orientation 50, the outlet direction 60 may be within an angle 112 of the vertical direction 36 for some embodiments of the modular exhaust collector 30 in the vertical orientation 50. That is, while the outlet direction 60 for the modular exhaust collector 30 in the vertical orientation 50 may be generally in the vertical direction 36, the outlet direction 60 may also be inclined from the vertical direction 36 by the angle 112 toward one of the lateral directions 40 or 42, toward the axial direction 32, or toward one of the lateral directions and toward the axial direction. In some embodiments, the angle 112 is 30 degrees, 15 degrees, 10 degrees, or 5 degrees or less. Likewise, while the outlet direction 60 for the modular exhaust collector 30 in one of the lateral orientations may be generally in the lateral direction 40 or 42, the outlet direction 60 may also be inclined from the lateral direction by the angle 112 toward the vertical direction 36, toward the axial direction 32, or any combination thereof.

FIG. 3 also illustrates the drain 88 of the bottom face 84 positioned at the low point of the modular exhaust collector 30 arranged in the vertical orientation 50. A sloped or curved surface of the bottom face 84 may direct liquids within the collector chamber 56 to the drain 88. In some embodiments, the drain 88 directs collected liquids to a reservoir for processing, storage, or disposal. As discussed above, the drains 88 may be disposed on the modular exhaust collector 30 to enable one of the drains 88 to be at the low point of the modular exhaust collector 30 in various orientations (e.g., vertical orientation, lateral orientation). For example, the drains 88 on the side walls 82 may be disposed at an angle (e.g., approximately 90 degrees) about the inlet axis 54 relative to the drain on the bottom face 84. Accordingly, the drains on the side walls 82 may be disposed at the low point when the modular exhaust collector 30 is rotated by the same angle (e.g., approximately 90 degrees) about the inlet axis 54.

Figure 4:
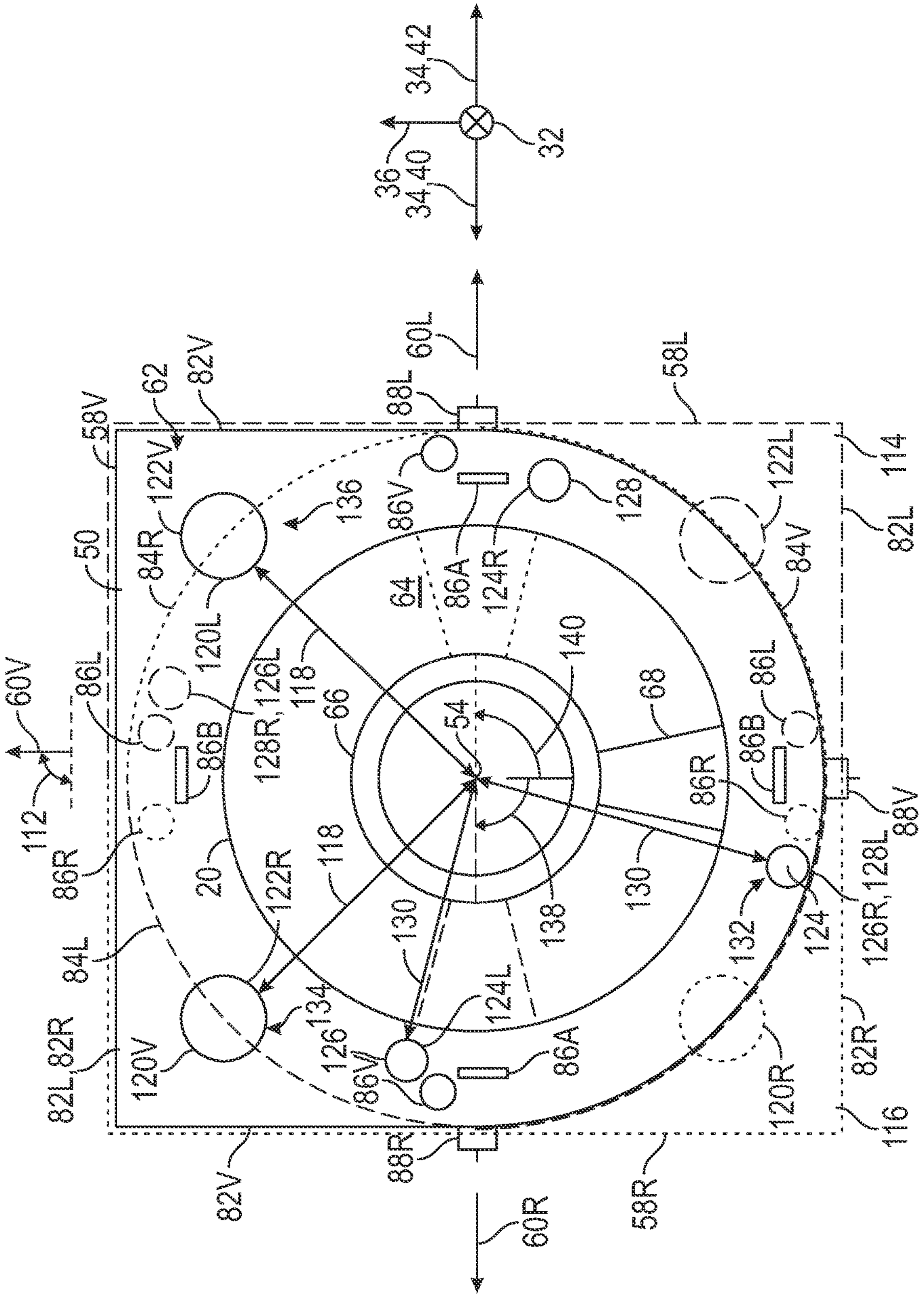
FIG. 4 is an axial view of multiple orientations of the modular exhaust collector of the gas turbine system, wherein the axial view is taken along line 4-4 of FIGS. 2 and 5.
Figure 5:
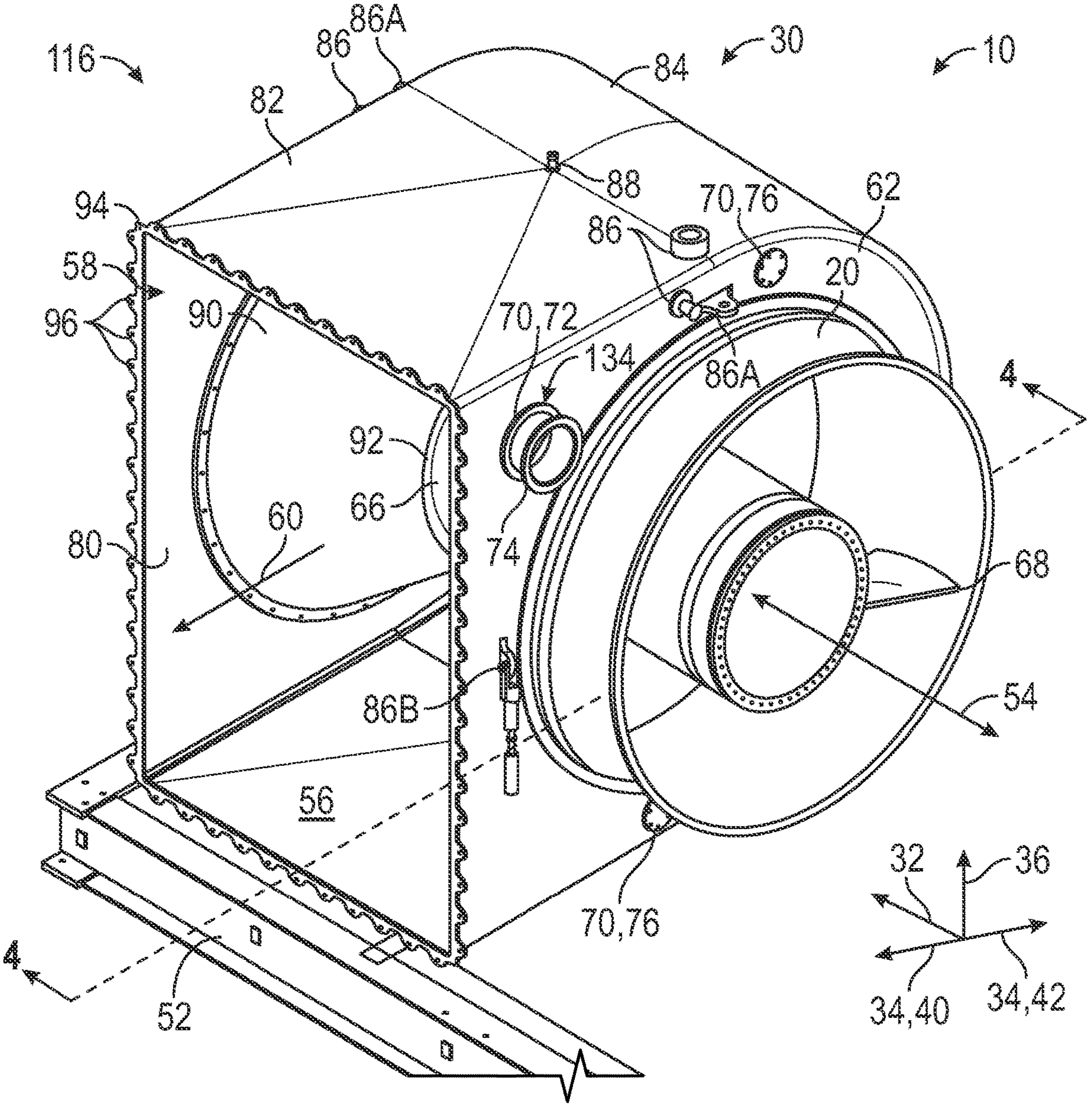
FIG. 5 is a perspective view of an embodiment of the modular exhaust collector of the gas turbine system, wherein the modular exhaust collector is arranged in a lateral orientation.

FIG. 4 is an axial view of multiple orientations of the modular exhaust collector 30 of the gas turbine system 10, wherein the axial view is taken along line 4-4 of FIGS. 2 and 5. The solid lines of FIG. 4 illustrate the modular exhaust collector 30 arranged in the vertical orientation 50, the dashed lines of FIG. 4 illustrate the modular exhaust collector 30 arranged in a leftward lateral orientation 114, and the dotted lines of FIG. 4 illustrate the modular exhaust collector 30 arranged in a rightward lateral orientation 116. To further clarify components of the modular exhaust collector 30 in the various positions, many of the elements of FIG. 4 that are disposed in different positions in the various orientations are identified with reference numbers having the suffix "V" to indicate the position of the element in the vertical orientation 50, the suffix "L" to indicate the position of the element in the leftward lateral orientation 114, or the suffix "R" to indicate the position of the element in the rightward lateral orientation 116.

A first set of ports 120, 122 are disposed a first distance 118 from the inlet axis 54. One of the first set of ports 120, 122 may be configured to couple to the CD conduit 74 of the gas turbine system 10 in the vertical orientation 50, the rightward lateral orientation 116, or the leftward lateral orientation 114. In some embodiments of the gas turbine system 10, the CD conduit 74 may be configured to couple with one of the first set of ports 120, 122 at either a first position 134 or a second position 136 that is disposed the first distance 118 from the inlet axis 54. A second set of ports 124, 126, 128 are disposed a second distance 130 from the inlet axis 54. One of the second set of ports 124, 126, 128 may be disposed at a third position 132 relative to the inlet axis 54 when the modular exhaust collector 30 is in the vertical orientation 50, the rightward lateral orientation 116, or the leftward lateral orientation 114.

When the modular exhaust collector 30 is arranged in the vertical orientation 50, the outlet 58V is configured to direct the exhaust flow in the outlet direction 60V. The collector chamber 56 is defined by the inlet face 62, the side walls 82V, the bottom face 84V, the back face 80, and the outlet 58V. The CD conduit 74 may be coupled to one of the first set of ports 120V or 122V above the inlet axis 54. A flow conduit (e.g., A&O conduit 78) may be coupled to the port 124 of the second set of ports in the third position 132. The drain 88V on the bottom face 84V is positioned at the low point of the modular exhaust collector 30, such that liquids within the collector chamber 56 may be collected by the drain 88V for removal. Support structures 86V (e.g., trunnions) may be configured to support lifting the modular exhaust collector. The support links 86A may be coupled to a frame 52 or foundation of the gas turbine system 10 to secure the modular exhaust collector 30 in the vertical orientation 50.

The modular exhaust collector 30 may be rotated a first angle 138 about the inlet axis 54 in a first direction (e.g., clockwise) from the vertical orientation 50 to the leftward lateral orientation 114. The first angle 138 may be between 30 to 120 degrees inclusive, between 45 to 110 degrees inclusive, 60 to 110 degrees inclusive, 80 to 100 degrees inclusive, or approximately 90 degrees from the vertical direction 36. In some embodiments, the port 122 of the first set of ports is rotationally offset from the port 120 of the first set of ports by the first angle 138. Accordingly, rotation of the modular exhaust collector 30 by the first angle 138 in the first direction arranges the port 120 of the first set of ports in the second position 136. In some embodiments, the port 124 of the second set of ports is rotationally offset from the port 128 by the first angle 138, and the port 126 is rotationally offset from the port 124 by the first angle 138. Accordingly, rotation of the modular exhaust collector 30 by the first angle 138 in the first direction arranges the port 128 in the third position 132, where it may be coupled to the conduit 78.

When the modular exhaust collector 30 is arranged in the leftward lateral orientation 114, the outlet 58L is configured to direct the exhaust flow in the outlet direction 60L. The collector chamber 56 is defined by the inlet face 62, the side walls 82L, the bottom face 84L, the back face 80, and the outlet 58L. The CD conduit 74 may be coupled to the port 120L of the first set of ports above the inlet axis 54. A flow conduit (e.g., A&O conduit 78) may be coupled to the port 128L of the second set of ports in the third position 132. The drain 88L on the bottom face 84L is positioned at the low point of the modular exhaust collector 30, such that liquids within the collector chamber 56 may be collected by the drain 88L for removal. As discussed above, the side wall 82L may be sloped or curved to facilitate liquid collection at the drain 88L, and the drain 88L may be positioned at the low point of the modular exhaust collector 30 in the leftward lateral orientation 114. The support links 86B may be coupled to a frame 52 or foundation of the gas turbine system 10 to secure the modular exhaust collector 30 in the leftward lateral orientation 114.

The modular exhaust collector 30 may be rotated a second angle 140 about the inlet axis 54 in a second direction (e.g., counterclockwise) from the vertical orientation 50 to the rightward lateral orientation 116. The second angle 140 may be between 30 to 120 degrees inclusive, between 45 to 110 degrees inclusive, 60 to 110 degrees inclusive, 80 to 100 degrees inclusive, or approximately 90 degrees from the vertical direction 36. The second angle 140 may have the same magnitude as the first angle 138. In some embodiments, the port 122 of the first set of ports is rotationally offset from the port 120 of the first set of ports by the second angle 140. Accordingly, rotation of the modular exhaust collector 30 by the second angle 140 in the second direction arranges the port 122 of the first set of ports in the first position 134. In some embodiments, the port 126 of the second set of ports is rotationally offset from the port 124 by the second angle 140, and the port 124 is rotationally offset from the port 128 by the second angle 140. Accordingly, rotation of the modular exhaust collector 30 by the second angle 140 in the second direction arranges the port 126 in the third position 132, where it may be coupled to the conduit 78.

When the modular exhaust collector 30 is arranged in the rightward lateral orientation 116, the outlet 58R is configured to direct the exhaust flow in the outlet direction 60R. The collector chamber 56 is defined by the inlet face 62, the side walls 82R, the bottom face 84R, the back face 80, and the outlet 58R. The CD conduit 74 may be coupled to the port 122R of the first set of ports above the inlet axis 54. A flow conduit (e.g., A&O conduit 78) may be coupled to the port 126R of the second set of ports in the third position 132. The drain 88R on the bottom face 84R is positioned at the low point of the modular exhaust collector 30, such that liquids within the collector chamber 56 may be collected by the drain 88R for removal. As discussed above, the side wall 82R may be sloped or curved to facilitate liquid collection at the drain 88R, and the drain 88R may be positioned at the low point of the modular exhaust collector 30 in the rightward lateral orientation 116. The support links 86B may be coupled to the frame 52 or foundation of the gas turbine system 10 to secure the modular exhaust collector 30 in the rightward lateral orientation 116.

While the above described embodiments of the modular exhaust collector 30 are illustrated such that the vertical orientation 50 is rotationally offset from the lateral orientations 114, 116 by 90 degrees, some embodiments of the modular exhaust collector 30 may have different configurations of the plurality of ports 120, 122, 124, 126, and 128 and the drains 88. Moreover, while FIG. 4 describes the leftward orientation 114 and the rightward orientation 116 relative to the vertical orientation 50, some embodiments of the gas turbine system 10 with the modular exhaust collector 30 may be rearranged from one lateral orientation (e.g., the leftward lateral orientation 114) to another lateral orientation (e.g., the rightward orientation 116). Furthermore, some embodiments of the modular exhaust collector 30 may be arranged in an intermediate orientation in which the angle 138 or 140 from the outlet direction 60V is less than 90 degrees. Moreover, the modular exhaust collector 30 may be reversibly arranged, such that the modular exhaust collector 30 may be rearranged among various orientations (vertical orientation 50, leftward orientation 114, rightward orientation 116, intermediate orientations)

FIG. 5 is a perspective view of an embodiment of the modular exhaust collector 30 of the gas turbine system 10, wherein the modular exhaust collector 30 is arranged in the rightward lateral orientation 116. As described above, the modular exhaust collector 30 receives the exhaust flow along the inlet axis 54 from the diffuser 20 into the collector chamber 56, and redirects the exhaust flow through the outlet 58 in the outlet direction 60, which may be in the lateral direction 40 when the modular exhaust collector is in the rightward lateral orientation 116. Similar to the modular exhaust collector illustrated in FIG. 2, the CD port 72 positioned at the first position 134 may be coupled to the CD conduit 74 to receive the CD flow. The CD port 72 not coupled to the CD conduit 74 may be capped. In a similar manner, one flow port of the second set of one or more flow ports 76 may be coupled to an A&O conduit 78 at a position below the inlet axis 54. The rotational offset of ports of each set of ports of the plurality of ports 72 on the inlet face 62 facilitates coupling various components and conduits to the modular exhaust collector 30 in any of the described orientations. That is, the rotational offsets of each set of ports of the plurality of ports 72 may reduce the costs, efforts, and costs associated with changing the orientation of the modular exhaust collector 30.

Figure 6:
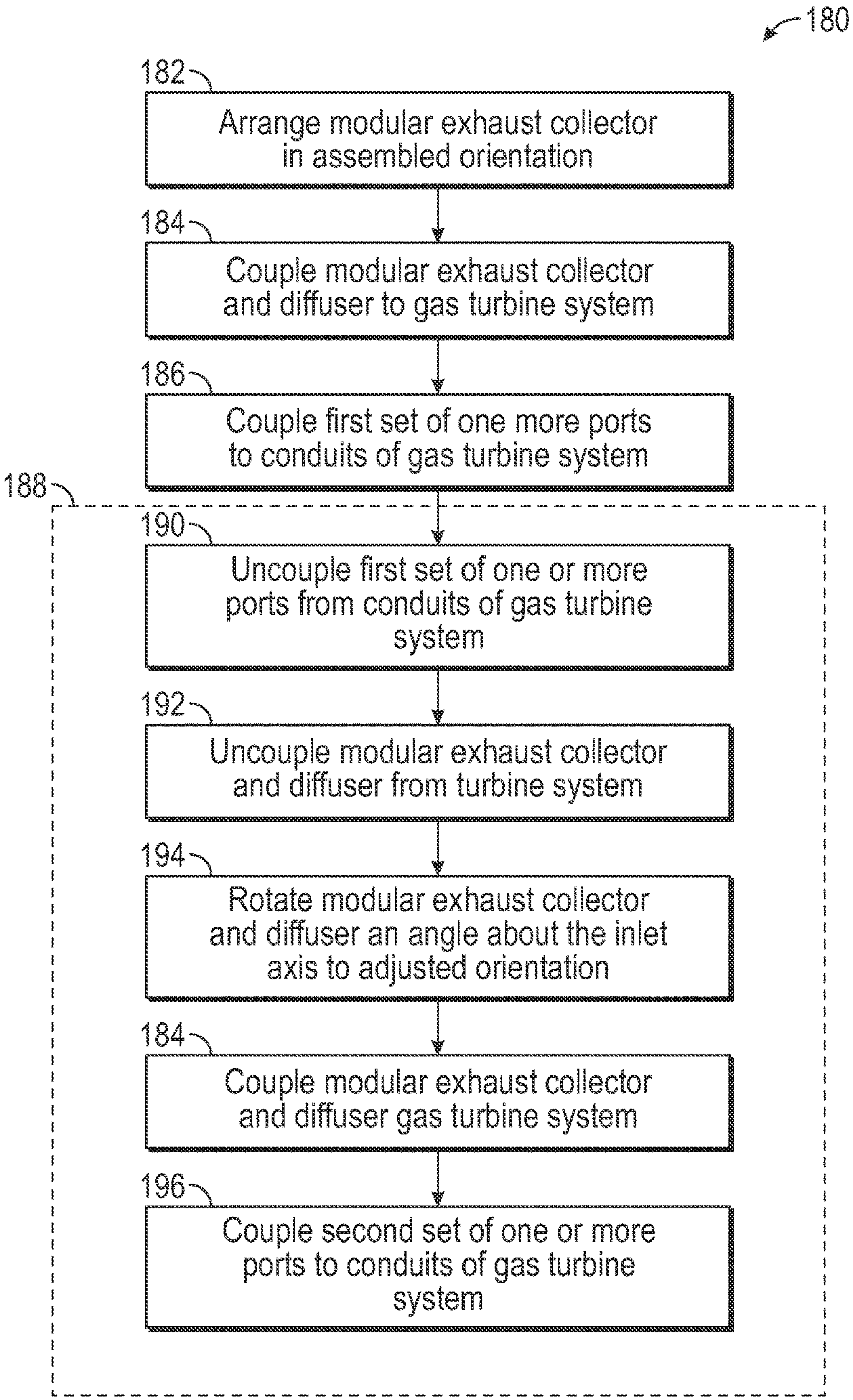
FIG. 6 illustrates a method of assembling the modular exhaust collector of the gas turbine system.

FIG. 6 illustrates a method 180 of assembling the modular exhaust collector with the gas turbine system. The modular exhaust collector may be arranged (block 182) on the frame or foundation with other components of the gas turbine system. The modular exhaust collector is arranged in the assembled orientation, which may include, but is not limited to the vertical orientation 50, the leftward orientation 114, or the rightward orientation 116. In the assembled orientation, the modular exhaust collector may be coupled (block 184) with the gas turbine system. For example, the diffuser of the gas turbine system may be coupled to the modular exhaust collector. In some embodiments, the diffuser of the gas turbine system is at least partially received within the modular exhaust collector. In some embodiment, the modular exhaust collector and the diffuser are coupled (block 184) with the gas turbine system. The outlet of the modular exhaust collector may be coupled to downstream systems including, but not limited to an HRSG, a catalyst, or an exhaust treatment system, or any combination thereof. One or more ports of a first set of ports of the modular exhaust collector may be coupled (block 186) to one or more respective conduits of the gas turbine system. The one or more respective conduits may facilitate fluid communication between the modular exhaust collector and other components of the gas turbine system, such as the compressor. As discussed above, the one or more conduits may include, but are not limited to compressor discharge conduits, air and oil separation conduits, among others.

The modular exhaust collector may be reversibly coupled to the gas turbine system in the assembled orientation, such that the modular exhaust collector may be rearranged (block 188) from the assembled orientation to an adjusted orientation. The adjusted orientation may include, but is not limited to the vertical orientation 50, the leftward orientation 114, or the rightward orientation 116. To rearrange the modular exhaust collector, the one or more ports of the first set of ports of the modular exhaust collector are uncoupled (block 190) from the one or more respective conduits of the gas turbine system. The modular exhaust collector is uncoupled (block 192) from the gas turbine system and any downstream systems. In some embodiments, both the modular exhaust collector and the diffuser are uncoupled (block 192) from the gas turbine system. The modular exhaust collector and optionally the diffuser may be rotated (block 194) by an angle about the inlet axis to the adjusted orientation. In some embodiments, the angle that the modular exhaust collector and the diffuser are rotated from the assembled orientation to the adjusted orientation may be 90 degrees or less, such as from the vertical orientation to a lateral orientation. However, in some embodiments the angle may be approximately 180 degrees or less if the assembled orientation is the leftward orientation, and the adjusted orientation is the rightward orientation. After rotating the modular exhaust collector and optionally the diffuser to the adjusted orientation, the modular exhaust collector and diffuser are coupled (block 184) with the gas turbine system and any downstream systems. One or more ports of a second set of ports of the modular exhaust collector may be coupled (block 196) to one or more respective conduits of the gas turbine system. The positions of the one or more ports of the second set of ports in the adjusted orientation may be the same positions relative to the inlet axis that the one or more ports of the first set of ports were disposed in when the modular exhaust collector was in the assembled orientation.

Technical effects of the above described embodiments include enabling an exhaust collector of a gas turbine system to be used in various orientations and with various configurations of a power plant system with the gas turbine system. The modular exhaust collector provides inventory flexibility for a manufacturer of the gas turbine system, thereby eliminating parts and costs associated with an exhaust collector with on only one orientation. Additionally, the modular exhaust collector enables the subsequent addition of exhaust processing equipment and/or heat recovery equipment to the power plant system without replacement of the modular exhaust collector. Furthermore, the multiple drains of the modular exhaust collector enable collected liquids to be drained form the collector chamber any of the above-described orientations.

This written description uses examples to disclose the embodiments, including the best mode, and also to enable any person skilled in the art to practice the claims, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system comprising:
a modular exhaust collector configured to be arranged in a plurality of orientations, wherein an outlet direction of an outlet is different for each orientation of the plurality of orientations, wherein the modular exhaust collector is configured to receive an exhaust flow along an inlet axis through an inlet face into a collector chamber and to direct the exhaust flow along the outlet direction, wherein the inlet axis is different than the outlet direction, and wherein the modular exhaust collector comprises:
the inlet face, wherein the inlet face comprises:
an exhaust passage configured to receive the exhaust flow;
a plurality of compressor discharge (CD) ports that may be selectively used based on an orientation of the modular exhaust collector; and
a plurality of flow ports that may be selectively used based on the orientation of the modular exhaust collector; and
a bottom face opposite the outlet, wherein the bottom face comprises a first drain that may be selectively used based on the orientation of the modular exhaust collector; and
a first side wall between the bottom face and the outlet, wherein the first side wall comprises a second drain that may be selectively used based on the orientation of the modular exhaust collector.

2. The system of claim 1, wherein each CD port of the plurality of CD ports is disposed a first radial distance from the inlet axis.

3. The system of claim 1, wherein each flow port of the plurality of flow ports is disposed a second radial distance from the inlet axis.

4. The system of claim 1, wherein:
when the modular exhaust collector is arranged in a first orientation, a first CD port of the plurality of CD ports is disposed in a first position and a first flow port of the plurality of flow ports is disposed in a second position; and
when the modular exhaust collector is arranged in a second orientation, a second CD port of the plurality of CD ports is disposed in the first position and a second flow port of the plurality of flow ports is disposed in the second position.

5. The system of claim 4, wherein the first CD port of the plurality of CD ports comprises a first cover and the first flow port of the plurality of flow ports comprises a second cover when the modular exhaust collector is arranged in the second orientation.

6. The system of claim 1, wherein the inlet axis is substantially perpendicular to the outlet direction for each orientation of the plurality of orientations.

7. The system of claim 1, wherein the plurality of orientations comprises a first outlet direction of the outlet and a second outlet direction of the outlet that are rotationally offset from each other by 180 degrees.

8. The system of claim 1, wherein the plurality of orientations comprises a leftward orientation and a rightward orientation.

9. The system of claim 8, wherein the modular exhaust collector comprises a second side wall opposite the first side wall and between the bottom face and the outlet, wherein the second side wall comprises a third drain, wherein the first drain is configured to be at a low point of the collector chamber to drain a liquid in the collector chamber in a first orientation, the second drain is configured to be at the low point in the leftward orientation, and the third drain is configured to be at the low point in the rightward orientation.

10. The system of claim 1, wherein the modular exhaust collector comprises a back face opposite the inlet face and a bore around the inlet axis through the exhaust passage and the inlet face, wherein the back face comprises a conical surface within the collector chamber, wherein the conical surface comprises a filleted connection to the bore.

11. The system of claim 1, wherein the outlet comprises a flange comprising a plurality of stress reducing features.

12. The system of claim 1, wherein the modular exhaust collector comprises a bore around the inlet axis through the exhaust passage and the inlet face, and a wedge coupled to the bore and a diffuser wall, wherein the wedge is arranged opposite the outlet.

13. The system of claim 1, wherein the bottom face comprises a curved surface configured to direct the exhaust flow toward the outlet.

14. A method, comprising:

rearranging a modular exhaust collector from an assembled orientation to an adjusted orientation relative to a turbine of a gas turbine system, wherein the modular exhaust collector is configured to receive from the turbine an exhaust flow along an inlet axis through an inlet face of the modular exhaust collector, wherein rearranging the modular exhaust collector comprises:

uncoupling a first port from a conduit of the gas turbine system before rotating the modular exhaust collector; and rotating the modular exhaust collector an angle about the inlet axis to reorient an outlet of the modular exhaust collector from an outlet direction in the assembled orientation to an adjusted outlet direction in the adjusted orientation, wherein the angle is greater than 90 degrees.

15. The method of claim 14, wherein the first port is disposed on an inlet face of the modular exhaust collector in a first position relative to the inlet axis.

16. The method of claim 15, wherein rotating the modular exhaust collector the angle arranges a second port disposed on the inlet face of the modular exhaust collector in the first position, and wherein the method comprises coupling the second port to the conduit of the gas turbine system after rotating the modular exhaust collector.

17. The method of claim 16, wherein rearranging the modular exhaust collector comprises:

uncoupling a third port from a second conduit of the gas turbine system, wherein the third port is disposed on the inlet face of the modular exhaust collector in a second position relative to the inlet axis;

rotating the modular exhaust collector the angle about the inlet axis to arrange a fourth port disposed on the inlet face of the modular exhaust collector in the second position; and coupling the fourth port to the second conduit of the gas turbine system.

18. The method of claim 14, wherein the outlet direction comprises a leftward direction, and the adjusted outlet direction comprises a rightward direction.

19. The method of claim 14, comprising coupling the outlet of the modular exhaust collector arranged in the adjusted outlet direction to a heat recovery steam generator (HRSG) disposed adjacent to the gas turbine system.

20. A system comprising:

a modular exhaust collector configured to be arranged in a plurality of orientations, wherein an outlet direction of an outlet is different for each orientation of the plurality of orientations, wherein the modular exhaust collector is configured to receive an exhaust flow along an inlet axis through an inlet face into a collector chamber and to direct the exhaust flow along the outlet direction, wherein the inlet axis is substantially perpendicular to the outlet direction for each orientation of the plurality of orientations, wherein the plurality of orientations comprise a first outlet direction of the outlet and a second outlet direction of the outlet that are rotationally offset from each other by 180 degrees, and wherein the modular exhaust collector comprises:

the inlet face, wherein the inlet face comprises:

an exhaust passage configured to receive the exhaust flow;

a plurality of compressor discharge (CD) ports that may be selectively used based on an orientation of the modular exhaust collector, wherein each CD port of the plurality of CD ports is disposed a first radial distance from the inlet axis; and a plurality of flow ports that may be selectively used based on the orientation of the modular exhaust collector, wherein each flow port of the plurality of flow ports is disposed a second radial distance from the inlet axis; and a bottom face opposite the outlet, wherein the bottom face comprises a first drain that may be selectively used based on the orientation of the modular exhaust collector; and a first side wall between the bottom face and the outlet, wherein the first side wall comprises a second drain that may be selectively used based on the orientation of the modular exhaust collector.

21. The method of claim 14, wherein the modular exhaust collector comprises a plurality of ports including the first port, wherein rotating the modular exhaust collector comprises changing an orientation of the plurality of ports, and rearranging the modular exhaust collector comprises selectively using the plurality of ports depending on the orientation.

22. The method of claim 21, wherein the plurality of ports comprise a plurality of compressor discharge (CD) ports, a plurality of flow ports, a plurality of drains, or a combination thereof.

* * * * *